March 11, 1952  A. CAPRA ET AL  2,588,614
DRAINING BASKET

Filed Aug. 10, 1946  3 Sheets-Sheet 1

INVENTOR
OTTAVIO CAPRA
AMNERIS CAPRA
BY
Benj. T. Rauber
ATTORNEY

March 11, 1952 A. CAPRA ET AL 2,588,614
DRAINING BASKET
Filed Aug. 10, 1946 3 Sheets-Sheet 2

INVENTOR
OTTAVIO CAPRA
AMNERIS CAPRA
BY
Benj. T. Rauber
ATTORNEY

March 11, 1952 A. CAPRA ET AL 2,588,614
DRAINING BASKET

Filed Aug. 10, 1946 3 Sheets-Sheet 3

INVENTOR
OTTAVIO CAPRA
AMNERIS CAPRA
BY
ATTORNEY

Patented Mar. 11, 1952

2,588,614

UNITED STATES PATENT OFFICE 2,588,614

DRAINING BASKET

Amneris Capra and Ottavio Capra,
Jamaica, N. Y.

Application August 10, 1946, Serial No. 689,637

3 Claims. (Cl. 99—410)

Our invention relates to improvements in cooking utensils and more particularly to a cooking vessel containing a draining basket in which vegetables, meat or fish can be cooked and then deposited onto a serving dish or platter without the necessity of lifting the food out of the basket.

When certain foods, particularly asparagus, broccoli or fish are cooked in a container, from which they must be lifted and placed onto a serving dish, the articles of food, having become soft, are liable to become broken and unattractive in appearance.

In our present invention we provide a basket in which the articles of food may be placed before cooking and in which they may remain in the cooking vessel during cooking. When the cooking is completed the basket may be lifted sufficiently in the cooking vessel or container to permit drainage and may then be brought over the serving dish or platter.

The basket of our invention is formed of two parts hinged together so that the parts supporting the food may swing apart and thus permit the food to be deposited on a serving dish or platter without being disturbed in position and may thus remain in a natural condition even though they are too tender to be lifted from the cooking vessel.

According to our invention, there is provided a cooking utensil having a pair of tilting supports adapted to hold the draining basket in an elevated position in the utensil to permit drainage.

The various features of our invention are illustrated, by way of example, in the accompanying drawings in which.

Figure 4:
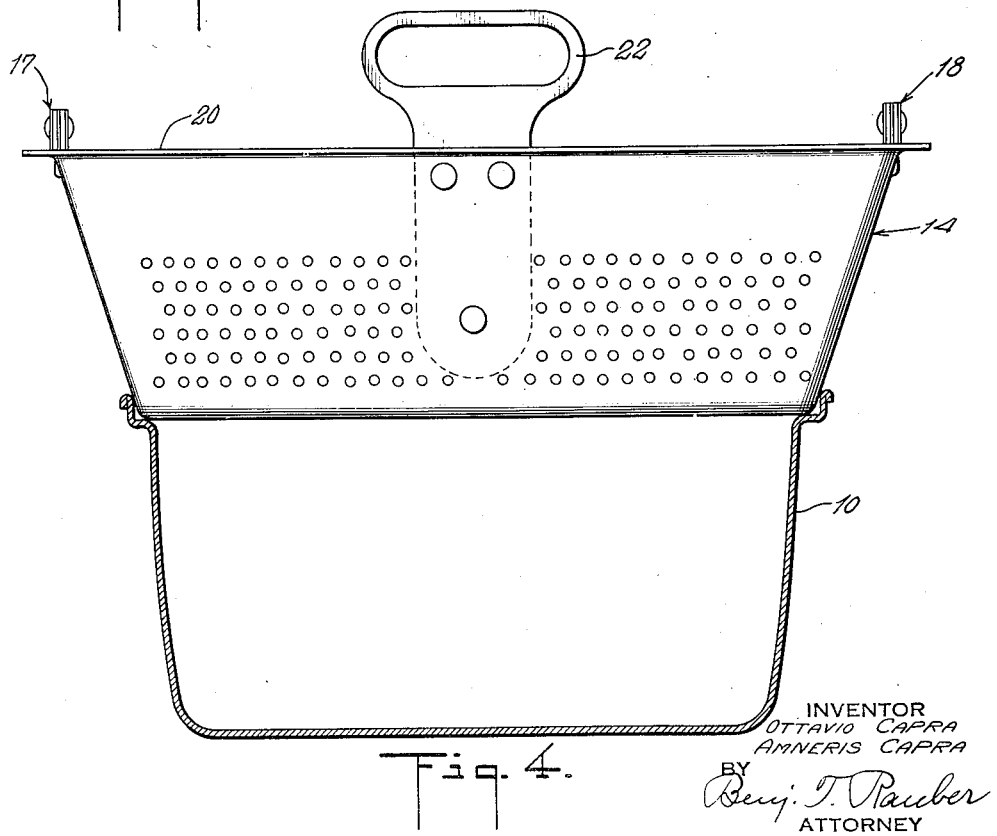
Fig. 4 is a similar view showing a different method of supporting the draining basket.
Figure 5:
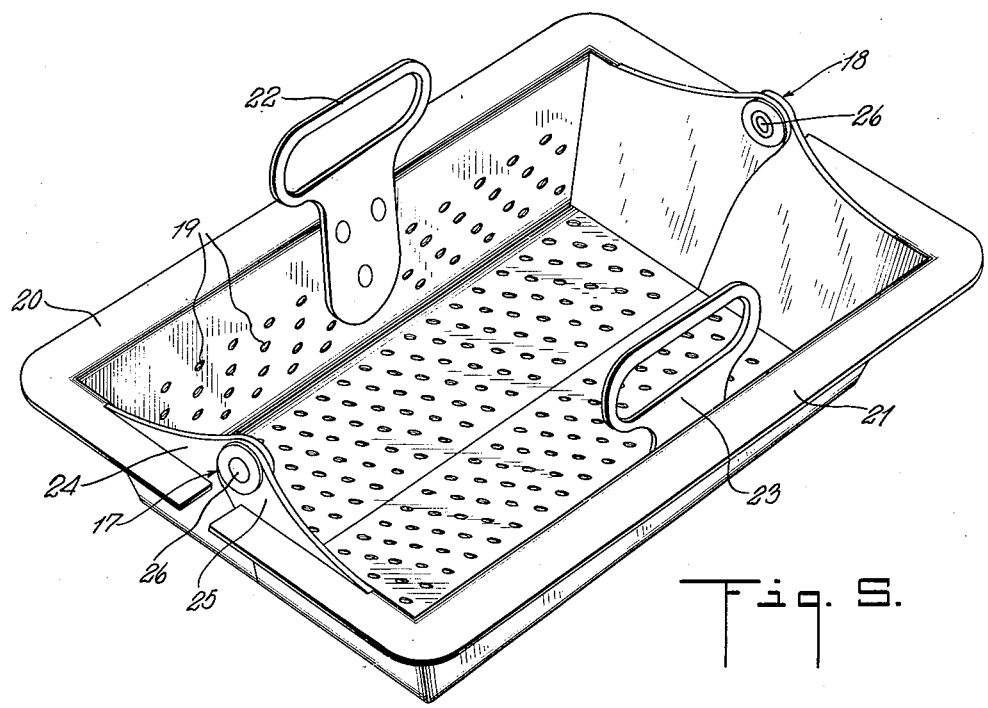
Fig. 5 is a perspective view of the draining basket.
Figure 6:
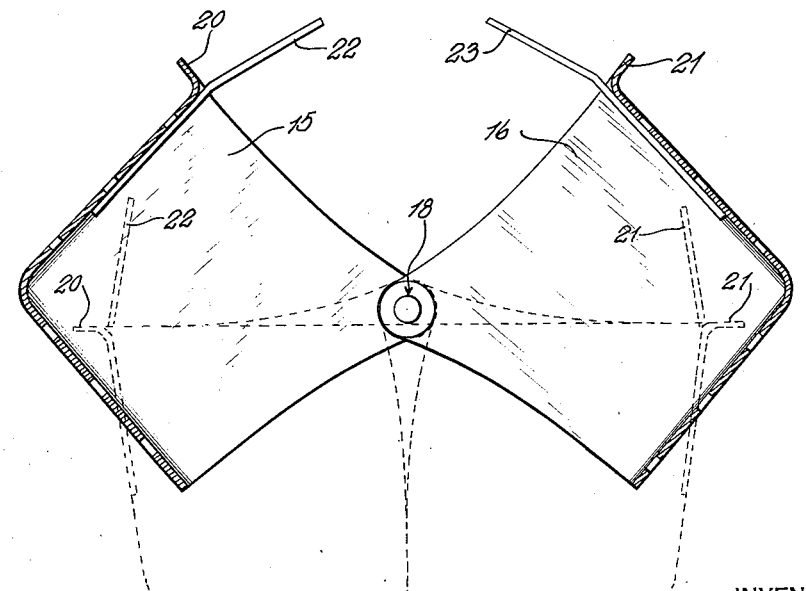
Fig. 6 is a cross-section showing the position of parts of the draining basket in closed position in broken lines and in open position in full lines.

Referring to Figs. 1–6 of the accompanying drawings, the cooking vessel comprises a pan 10 provided with handles 11 and 12 and a removable cover 13. Within the pan 10 is a draining basket 14 embodying a preferred form of our invention; this basket is shown particularly in Figs. 2, 5 and 6, and comprises two complementary parts 15 and 16 joined at their ends by spring loaded friction hinges 17 and 18 so that it may form a closed container when the parts 15 and 16 are swung together, or may open downwardly, as shown in Fig. 6, when the parts 15 and 16 are swung apart on their friction hinges 17 and 18.

The two parts 15 and 16 of the basket are perforated so that fluid, such as water or steam, may pass freely into or out of the basket; preferably the perforations are on the bottom and sides of the two parts 15 and 16, as shown at 19 in Fig. 5, while the ends of the basket may be solid or not perforated.

The two parts 15 and 16 of the basket are provided with side and end flanges 20 and 21 projecting outwardly from the upper edge of the basket to permit these flanges to rest on the rim of the pan 10 and thus support the basket spaced from the bottom and sides of the pan.

Each half of the basket is also provided with a handle 22 and 23 projecting upwardly from its side wall to enable the basket to be grasped for lifting out of the pan.

Each hinge 17 and 18 may be formed by providing upward extensions or ears 24 and 25 at each end of the basket positioned and shaped in such a way as to overlap. Through openings in these ears is passed a bolt or rivet 26 having a number of spring washers to provide friction for the hinge so that manual pressure will be required to open and close the basket and thus avoid spilling the food when the basket is lifted from the pan.

When the basket is in position for cooking it is supported from the upper edges of the pan 10 by the flanges 20 and 21. When lifted for draining it may be supported by a pair of supports, such as shown at 27 and 28 in Fig. 3; or if the basket and pan are somewhat greater in length than in width, the basket may be lifted free of the pan, then turned a quarter turn to the position shown in Fig. 4, whereupon it may rest at its end edges on the side edges of the pan. In this latter case it is of advantage to have the ends of the basket imperforate, as shown in Fig. 5, so that there will be no drainage except through the bottom and side parts above the pan.

Figure 1:
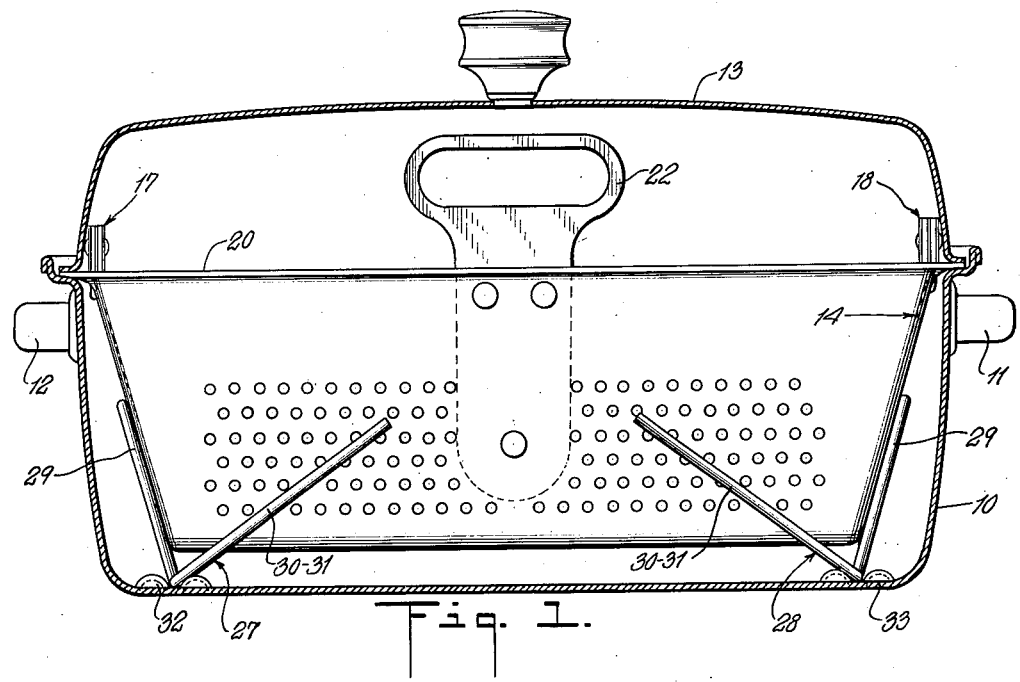
Fig. 1 is a longitudinal section taken on the line 1—1 of Fig. 2.
Figure 2:
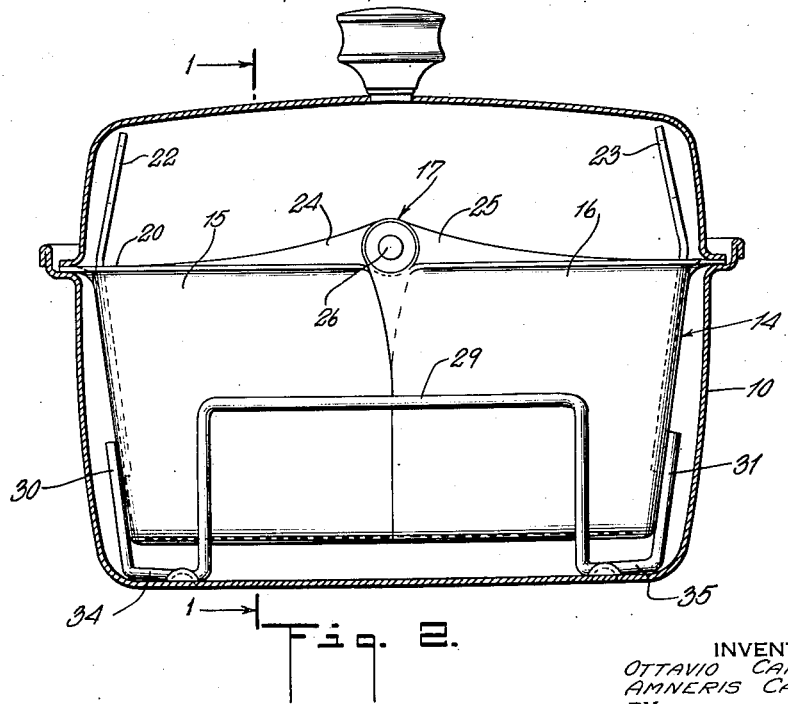
Fig. 2 is an end view of the draining basket and the cooking vessel, the vessel being shown in section.

The elements 27 and 28 are provided with an upright or vertical extension 29 which may be tilted clear of the basket as shown in Figs. 1 and 2, and with horizontal or inward extensions 30 and 31 at each side of the basket and extending at somewhat less than 90 degrees to the upward extension 29.

When the basket is inserted in the pan preparatory to cooking, the upward parts 29 are displaced outwardly to permit the basket to be set between them, the horizontal parts 30 and 31 then being lifted as shown in Figs. 1 and 2, to form a support for the basket 20 in the cooking position. This operation of parts 29 through 31 is effected automatically as the basket 20 comes in contact therewith during its insertion in the outer cooking vessel.

When the basket is lifted upwardly above the supporting elements the weight of the horizontal parts automatically tilts the supports inwardly to the position shown in Fig. 3 bringing the upwardly extending parts 29 below the bottom of the basket. The basket may then be lowered and supported on these supports for draining.

The supporting elements may be made of wire bent into the loop 29 and outwardly and inwardly to the side extensions or arms 30 and 31 as shown in Fig. 2.

The bottom of the pan may be provided with upwardly extending protuberances 32 and 33 on which the lowermost parts 34 and 35, Fig. 2, of the supporting element may be anchored to enable them to be turned freely. However this is not generally necessary and a smooth pan of ordinary construction may be employed.

Figure 3:
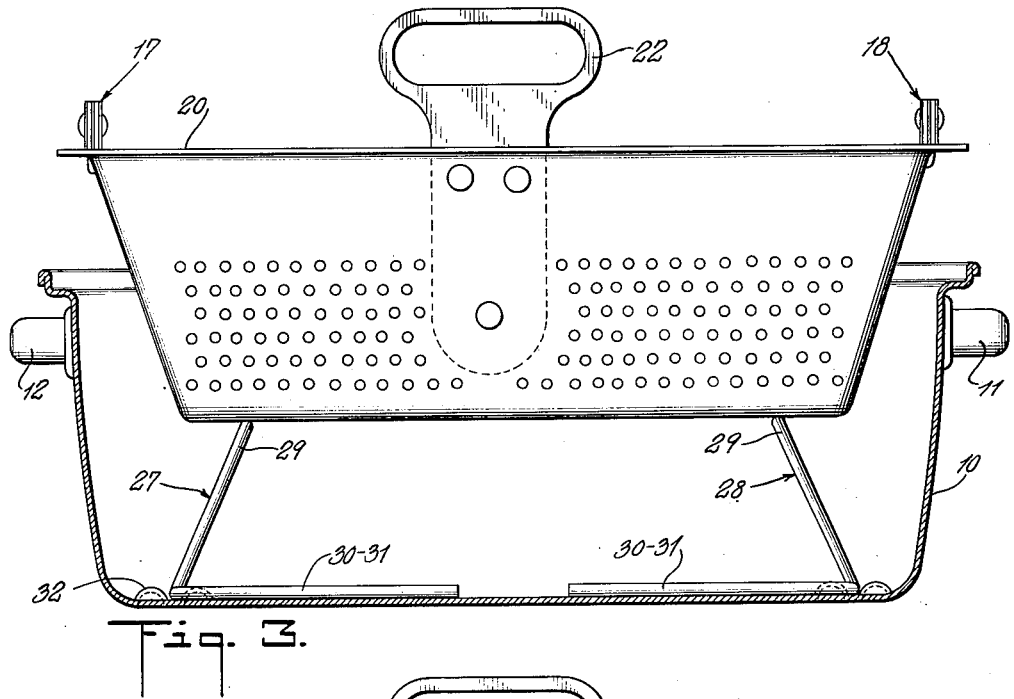
Fig. 3 is a side view of the draining basket and of the cooking vessel, in section, showing the basket raised in position to permit drainage.

When the cooking has been completed it is only necessary to lift the basket to the position shown in Figs. 3 and 4 to permit drainage of the water and then transfer it above a dish or platter on which the food is to be deposited. When in the latter position it is only necessary to push inwardly on the handles 22 and 23 to enable the parts 15 and 16 to separate gradually, whereupon the food will be deposited, without substantial displacement, on the platter or dish.

The invention may be applied to cooking vessels of any desired shape; circular, rectangular, square, oval, or other shape.

What we claim is:

1. A cooking utensil comprising an outer container, a draining basket within said container, said basket having flanges at its upper edge to rest upon the upper edge of the container, and a pair of support members having an upright, substantially U-shaped portion, a pair of base portions connected to said U-shaped portion and resting on the bottom of the outer container, and a pair of sidewise extensions enclosing an angle of less than 90° with said base portions, said extensions being adapted to rest on the bottom of the container whereby said U-shaped portions serve as an upright support, and said latter portions being displaceable outward and beyond the perimeter of the basket when said basket is lowered into the outer container.

2. A cooking utensil according to claim 1 wherein the bottom of the outer container is provided with protuberances adapted to serve as anchors for the base portions of the support members.

3. A cooking utensil comprising an outer container, a draining basket within said container, said basket having flanges at its upper edge to rest upon the flanged upper edge of the container, a pair of support members for said basket, each of said members being bent from one piece of wire into an upright, substantially U-shaped portion, a pair of base portions co-planar with said U-shaped portion and resting on the bottom of the outer container, and a pair of sidewise extensions enclosing an angle of less than 90° with said base portions, and anchor means for said base portions on which said support members are pivoted, said extensions being adapted to rest on the bottom of the container whereby said U-shaped portions form an upright support, and said latter portions being automatically displaceable outward and beyond the perimeter of the basket when said basket is lowered into the outer container.

AMNERIS CAPRA.
OTTAVIO CAPRA.

REFERENCES CITED

The following references are of record in the file of this patent:

UNITED STATES PATENTS

| Number | Name | Date |
| --- | --- | --- |
| 314,986 | Aevis | Apr. 7, 1885 |
| 374,788 | Forg | Dec. 13, 1887 |
| 540,764 | Spring | June 11, 1895 |
| 611,705 | Ohermann | Oct. 4, 1898 |
| 892,638 | Wilson | July 7, 1908 |
| 1,276,749 | George | Aug. 27, 1918 |
| 1,445,457 | Simon | Feb. 13, 1923 |
| 1,867,346 | Bittorf | July 12, 1932 |

FOREIGN PATENTS

| Number | Country | Date |
| --- | --- | --- |
| 14,855 | Great Britain | Sept. 20, 1890 |
| 22,542 | Great Britain | Oct. 4, 1909 |
| 59,632 | Switzerland | Jan. 30, 1912 |